United States Patent
Tanaka et al.

(10) Patent No.: US 7,734,388 B2
(45) Date of Patent: Jun. 8, 2010

(54) APPARATUS FOR DETECTING ANOMALY OF WHEEL SPEED SENSORS

(75) Inventors: Hirohisa Tanaka, Nagoya (JP); Yoshimasa Yamamoto, Okazaki (JP); Kazuhiro Kato, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 62 days.

(21) Appl. No.: 11/510,603

(22) Filed: Aug. 28, 2006

(65) Prior Publication Data
US 2007/0050107 A1 Mar. 1, 2007

(30) Foreign Application Priority Data
Aug. 29, 2005 (JP) ............................. 2005-247583

(51) Int. Cl.
| | |
|---|---|
| G01M 17/00 | (2006.01) |
| G06F 7/00 | (2006.01) |
| G06F 19/00 | (2006.01) |
| G01B 3/00 | (2006.01) |
| G01B 5/00 | (2006.01) |
| G01B 5/28 | (2006.01) |
| G01B 5/30 | (2006.01) |
| G01P 21/00 | (2006.01) |
| G01C 17/38 | (2006.01) |
| G01L 27/00 | (2006.01) |
| E01C 23/00 | (2006.01) |
| G01N 19/00 | (2006.01) |

(52) U.S. Cl. ............................. 701/29; 73/1.37; 73/146; 73/865.9; 73/432.1; 702/33; 702/35; 702/96; 702/98; 702/104

(58) Field of Classification Search ............ 340/426.33, 340/444, 936; 701/34, 55, 148
See application file for complete search history.

(56) References Cited

U.S. PATENT DOCUMENTS

| | | | | |
|---|---|---|---|---|
| 5,430,652 A | * | 7/1995 | Fujioka | 701/74 |
| 5,642,280 A | * | 6/1997 | Negrin et al. | 701/1 |
| 5,721,528 A | * | 2/1998 | Boesch et al. | 340/442 |
| 5,748,503 A | * | 5/1998 | Saeki et al. | 702/148 |
| 5,922,038 A | * | 7/1999 | Horiuchi et al. | 701/34 |

(Continued)

FOREIGN PATENT DOCUMENTS

JP 2000-344087 12/2000

*Primary Examiner*—Khoi Tran
*Assistant Examiner*—Nicholas Kiswanto
(74) *Attorney, Agent, or Firm*—Buchanan Ingersoll & Rooney PC

(57) ABSTRACT

A wheel-speed-sensor-anomaly detection apparatus detects anomaly of wheel speed sensors of a vehicle. When a difference between the minimum wheel speed among detected wheel speeds and the smallest value among the remaining wheel speeds is greater than a predetermined threshold value, in principle, a wheel speed sensor of the wheel corresponding to the minimum wheel speed is determined to be anomalous. Meanwhile, when a wheel having a lowered tire air pressure (air-pressure-lowered wheel) is present and a road surface on which the vehicle is currently traveling is a low-µ road surface, the operation of detecting anomaly of the wheel speed sensors is prohibited. This operation reliably prevents erroneous detection of anomaly of the wheel speed sensor of the air-pressure-lowered wheel, which erroneous detection would otherwise occur due to the locking tendency of the air-pressure-lowered wheel occurring because of decreased tire air pressure, in particular, on a low-µ road surface.

7 Claims, 6 Drawing Sheets

U.S. PATENT DOCUMENTS

| | | | |
|---|---|---|---|
| 5,940,781 A * | 8/1999 | Nakajima | 702/98 |
| 6,182,021 B1 * | 1/2001 | Izumi et al. | 702/138 |
| 6,434,457 B2 * | 8/2002 | Okita et al. | 701/34 |
| 6,526,367 B1 * | 2/2003 | Yamamoto et al. | 702/148 |
| 6,725,136 B2 * | 4/2004 | Lutz et al. | 701/29 |
| 2001/0027362 A1 * | 10/2001 | Nishida et al. | 701/34 |
| 2003/0048179 A1 * | 3/2003 | Griesser et al. | 340/444 |
| 2004/0193340 A1 * | 9/2004 | Katou | 701/29 |
| 2005/0099276 A1 * | 5/2005 | Fujioka | 340/426.19 |
| 2005/0114008 A1 * | 5/2005 | Scelers | 701/92 |

* cited by examiner

APPARATUS FOR DETECTING ANOMALY OF WHEEL SPEED SENSORS

CROSS REFERENCE TO RELATED APPLICATION

This application is based on and claims under 35 U.S.C. sect, 119 with respect to Japanese Patent Application No. 2005-247583 filed on Aug. 29, 2005, the entire content of which is incorporated herein by reference.

BACKGROUND OF THE INVENTION

1. Field of the Invention

The present invention relates to an apparatus for detecting anomaly of wheel speed sensors on the basis of at least rotational speeds of wheels (wheel speeds) detected by the wheel speed sensors.

2. Description of the Related Art

Conventionally, an apparatus for detecting anomaly of wheel speed sensors (hereinafter referred to as a "wheel-speed-sensor-anomaly detection apparatus") has been known (see, for example, Japanese Patent Application Laid-Open (kokai) No. 2000-344087). In general, such an apparatus utilizes a phenomenon that when a wheel speed sensor becomes anomalous, the wheel speed tends to be detected as a slower speed. That is, such an apparatus is configured such that when the wheel speed of a specific wheel, among the wheel speeds detected by wheel speed sensors disposed for individual wheels, is considerably lower than the wheel speeds of the remaining wheels, the wheel speed sensor of the specific wheel is determined to be anomalous.

Incidentally, when the gas pressure (typically, air pressure) of a tire decreases, the rolling resistance of the tire increases because of, for example, an increased area of the tire tread. As a result, when a vehicle is traveling on, in particular, a road surface having a low frication coefficient, such as an icy road surface, a wheel corresponding to a tire having a reduced gas pressure (hereinafter referred to as "gas-pressure-lowered wheel") tends to lock, with the result that the actual wheel speed of the gas-pressure-lowered wheel may become lower than those of the remaining wheels.

In such a case, the above-described wheel-speed-sensor-anomaly detection apparatus raises a problem in that even when the wheel speed sensor of the gas-pressure-lowered wheel is normal, the apparatus erroneously determines that the wheel speed sensor of the gas-pressure-lowered wheel is anomalous.

SUMMARY OF THE INVENTION

The present invention has been accomplished in order to cope with the above-described drawback, and an object of the present invention is to provide a wheel-speed-sensor-anomaly detection apparatus which can detect anomaly of a wheel speed sensor and which does not erroneously detect anomaly of a wheel speed sensor because of a lowered gas pressure of a corresponding tire.

A wheel-speed-sensor-anomaly detection apparatus according to the present invention is applicable to a vehicle equipped with wheel speed sensors for detecting wheel speeds of respective wheels, and comprises anomaly detection means for detecting anomaly of the wheel speed sensors on the basis of at least rotational speeds of the wheels detected by the wheel speed sensors.

The anomaly detection means is configured such that when a difference between the minimum wheel speed among wheel speeds detected by the wheel speed sensors disposed for the respective wheels and the smallest value among the remaining wheel speeds is greater than a predetermined threshold value, the anomaly detection means determines that the wheel speed sensor of the wheel corresponding to the minimum wheel speed is anomalous.

The wheel-speed-sensor-anomaly detection apparatus of the present invention is characterized by comprising gas-pressure-decrease detection means for detecting a decrease in tire gas pressure of each wheel; and restriction means for imposing a restriction on the wheel-speed-sensor-anomaly detection operation of the anomaly detection means when a decrease in the tire gas pressure is detected. The gas-pressure-decrease detection means is configured to determine that the tire gas pressure has decreased when the tire gas pressure becomes lower than a lower limit of a normal range of the tire gas pressure.

By virtue of this configuration, when a decrease in tire gas pressure is detected, a restriction is imposed on the wheel-speed-sensor-anomaly detection operation of the anomaly detection means. In other words, anomaly of a wheel speed sensor becomes difficult to detect (or becomes impossible to detect). Accordingly, the above-described erroneous detection of anomaly of a wheel speed sensor due to decreased tire gas pressure can be prevented.

In this case, preferably, the wheel-speed-sensor-anomaly detection apparatus of the present invention further comprises road-surface determination means for determining whether or not a road surface on which the vehicle is traveling is a road surface having a predetermined low friction coefficient, such as an icy road surface (hereinafter referred to as "low-μ road surface"); and restriction releasing means for releasing the restriction imposed on the wheel-speed-sensor-anomaly detection operation of the anomaly detection means by means of the restriction means when the road surface on which the vehicle is traveling is determined not to be a low-μ road surface.

The phenomenon in which a tire becomes likely to lock because of decreased gas pressure of the tire is more likely to occur on, in particular, a low-μ road surface. In other words, the erroneous detection of anomaly of a wheel speed sensor due to a decrease in the corresponding tire gas pressure hardly occurs on a road surface which is not a low-μ road surface and has a relatively high friction coefficient. For road surfaces other than low-μ road surfaces, the necessity of imposing a restriction on the wheel-speed-sensor-anomaly detection operation is low.

The above-described configuration is based on such a finding. The above-described configuration can prevent unnecessary imposition of a restriction on the wheel-speed-sensor-anomaly detection operation and can suppress a decrease in the number of occasions in which anomaly of a wheel speed sensor is detected.

In the wheel-speed-sensor-anomaly detection apparatus of the present invention, the restriction means may be configured such that when a decrease in the tire gas pressure is detected, the restriction means prohibits the wheel-speed-sensor-anomaly detection operation of the anomaly detection means. By virtue of this configuration, the erroneous detection of anomaly of a wheel speed sensor due to a decrease in the corresponding tire gas pressure can be prevented without fail.

Alternatively, the restriction means may be configured such that the greater the decrease in the tire gas pressure, the greater the degree to which the restriction means imposes the restriction on the wheel-speed-sensor-anomaly detection operation of the anomaly detection means.

In this case, specifically, when the anomaly detection means is configured to determine that the wheel speed sensor of the wheel corresponding to the minimum wheel speed is anomalous when the difference between the minimum wheel speed and the smallest value among the remaining wheel speeds is greater than the predetermined threshold value, the restriction means is configured to increase the threshold value with the degree of the decrease in the tire gas pressure.

The phenomenon in which a tire becomes likely to lock because of a decreased gas pressure of the tire is more likely to occur when the degree of the decrease in the tire gas pressure is large. In other words, the erroneous detection of anomaly of a wheel speed sensor due to a decrease in the corresponding tire gas pressure hardly occurs when the degree of the decrease in the tire gas pressure is small. Accordingly, when the degree of the decrease in the tire gas pressure is small, the necessity of imposing a large restriction on the wheel-speed-sensor-anomaly detection operation is low.

The above-described configuration is based on such a finding. The above-described configuration can prevent imposition of an excessive restriction on the wheel-speed-sensor-anomaly detection operation, and the erroneous detection of anomaly of a wheel speed sensor due to a decrease in the corresponding tire gas pressure can be prevented.

A wheel speed detection apparatus for a vehicle equipped with assemblies of a wheel and a tire as well as respective wheel speed sensors according to the present invention is characterized by comprising first detection means for detecting anomaly of the wheel speed sensors on the basis of wheel speed detected by the wheel speed sensors; second detection means for detecting decrease of air pressure in the tires; and restriction means for restricting to detect anomaly by the first detection means in respect of a specific wheel when the decrease of the air pressure of the tire concerning the specific wheel is detected by the second detection means.

In this case, "air pressure" is not limited to pressure of air. "Air pressure" may be pressure of nitrogen.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Fist Embodiment

Figure 1:
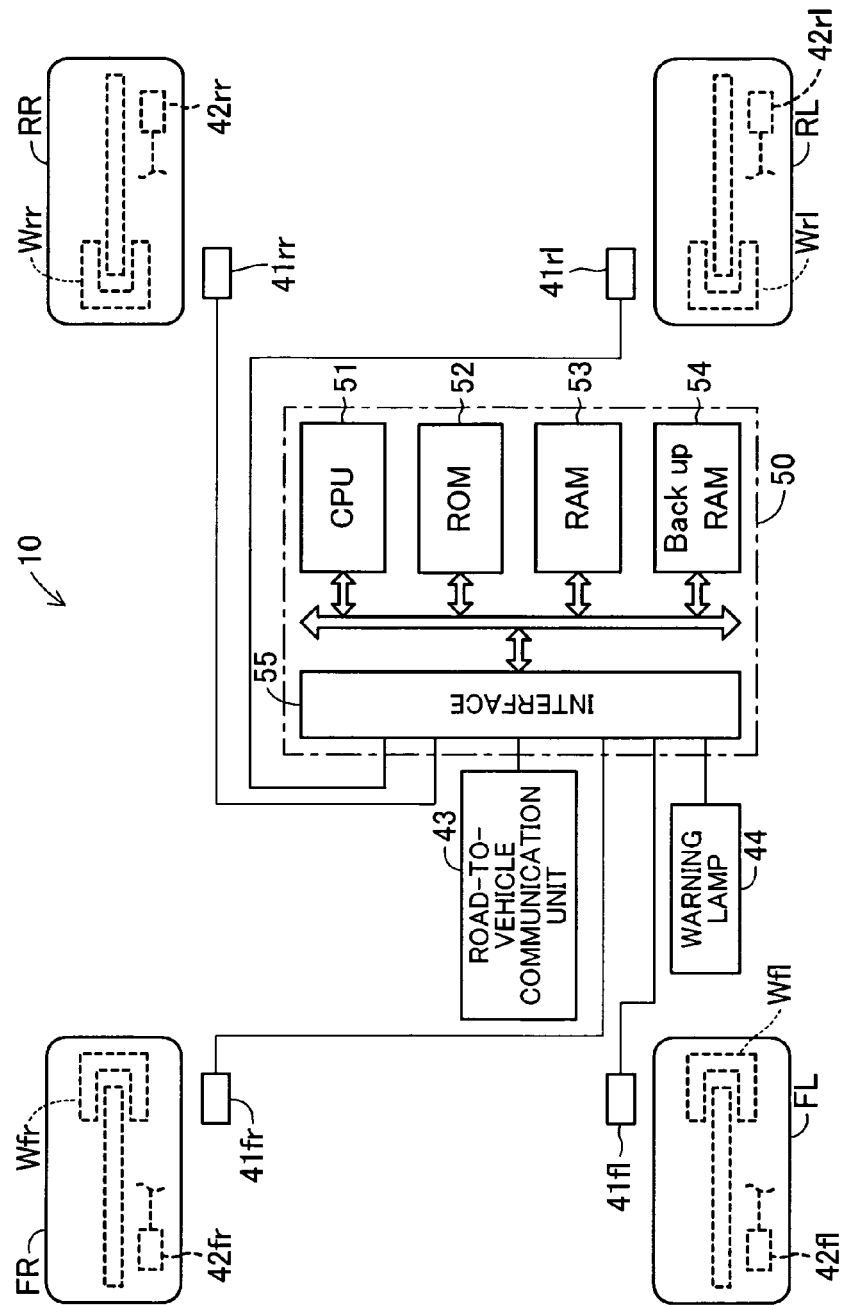
FIG. 1 is a schematic diagram of a vehicle equipped with a vehicle control apparatus including a wheel-speed-sensor-anomaly detection apparatus according to a first embodiment of the present invention.

FIG. 1 schematically shows the configuration of a vehicle equipped with a vehicle control apparatus 10 including a wheel-speed-sensor-anomaly detection apparatus according to a first embodiment of the present invention. The vehicle control apparatus 10 includes wheel speed sensors 41 each outputting a signal which includes a pulse generated every time the corresponding wheel rotates through a predetermined angle; gas pressure sensors 42 for detecting gas pressures of corresponding tires (tire air pressures P**); a road-to-vehicle communication unit 43 for performing road-to-vehicle communications; and a warning lamp 44.

Notably, the symbol "" appended to various sensors and the like collectively represents the symbols fr, fl, rr, and rl, and indicates that the particular sensor or the like applies to all of the wheels FR, FL, etc. of the vehicle. For example, the wheel speed sensors 41 collectively indicate the wheel speed sensor 41*fr* for the front right wheel, the wheel speed sensor 41*fl* for the front left wheel, the wheel speed sensor 41*rr* for the rear right wheel, and the wheel speed sensor 41*rl* for the rear left wheel.

Each of the wheel speed sensors 41** is a magnetic-pickup-type (coil-type) sensor fixedly disposed in relation to the rotation center of a rotary member which is formed of a magnetic member assuming the shape of an external gear and which rotates together with the wheel, such that the sensor faces the outer circumferential surface of the rotary member with a predetermined gap therebetween. Examples of anomaly of the magnetic-pickup-type sensor include an anomaly in which the gap is increased because of collision with flying gravel during vehicle travel, and an anomaly in the shape of the teeth portions of the rotary member (e.g., eccentricity of the rotary member, fracture of a portion of the plurality of teeth portions, etc.). When such an anomaly occurs, the wheel speed tends to be detected as a lower speed.

The road-to-vehicle communication unit 43 is configured to obtain various data, including road-surface friction coefficient μ, etc., from infrastructure or the like disposed around the vehicle. The warning lamp 44 is turned on when an anomaly of the wheel speed sensors 41** is detected as will be described later.

The vehicle control apparatus 10 includes an electronic controller 50. The electronic controller 50 is formed of a microcomputer which includes a CPU 51; ROM 52 in which are previously stored programs to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like.

The interface 55 is electrically connected to the sensors and other components 41 to 44 by means of wire connection or wireless connection. The interface 55 receives signals from the sensors and other components 41 to 44 and sends them to the CPU 51. Further, the interface 55 sends a turn-on signal to the warning lamp 44 in accordance with an instruction from the CPU 51.

Actual Operation

Actual operation of the vehicle control apparatus 10 including the wheel-speed-sensor-anomaly detection apparatus of the present invention and configured as described above (the vehicle control apparatus 10 may be simply referred to as the "present apparatus") will be described with reference to FIGS. 2 and 3, which show, in the form of flowcharts, routines (programs) executed by the CPU 51 of the electronic controller 50.

Figure 2:
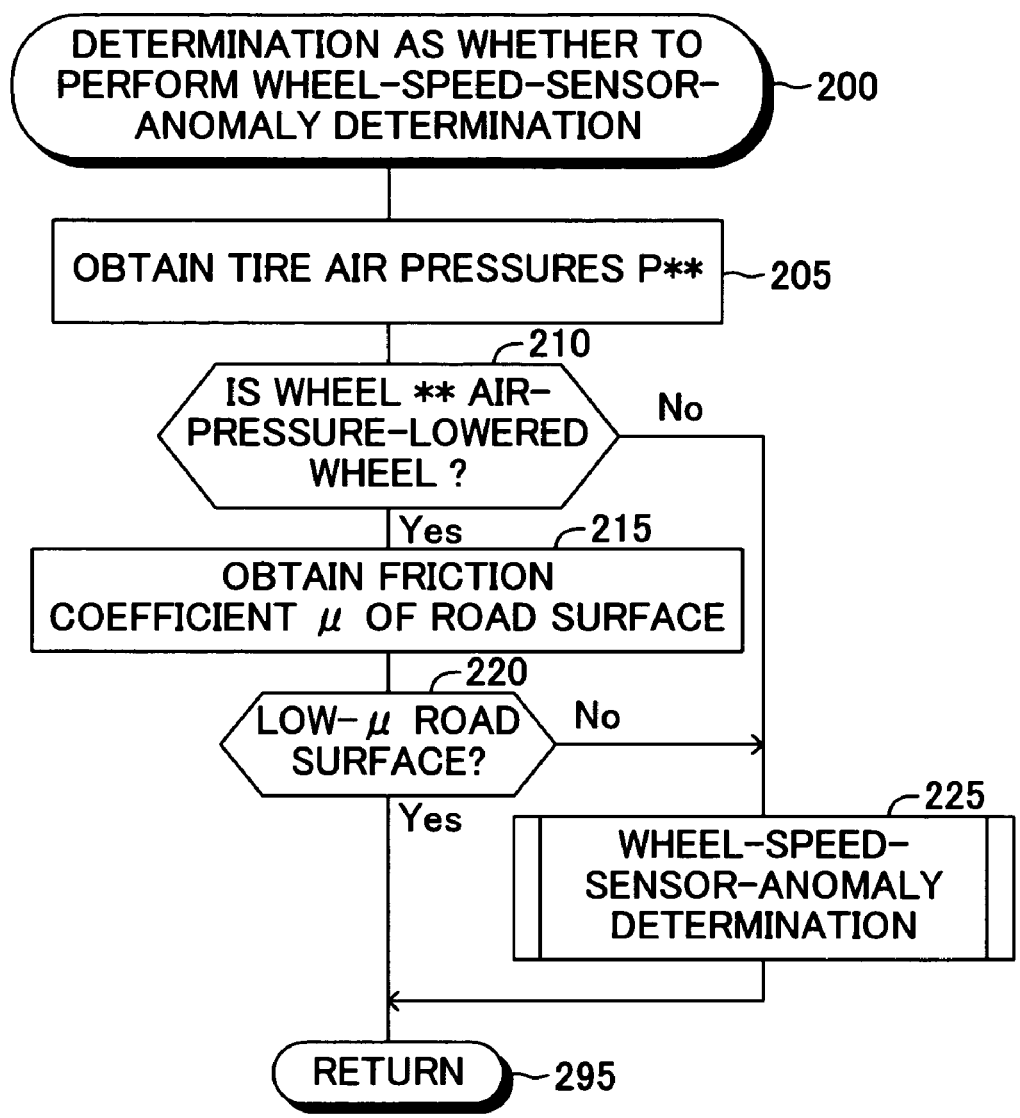
FIG. 2 is a flowchart showing a routine which a CPU shown in FIG. 1 executes in order to determine whether to perform wheel-speed-sensor-anomaly determination.

The CPU 51 repeatedly performs, at predetermined intervals, the routine shown in FIG. 2 for determining whether to perform wheel-speed-sensor-anomaly determination. Accordingly, when a predetermined timing is reached, the CPU 51 starts processing of the routine from Step 200, and proceeds to Step 205 so as to obtain tire air pressures P of the wheels from the gas pressure sensors 42\*\*.

Subsequently, the CPU 51 proceeds to Step 210, and determines whether or not wheel ** is a wheel having a lowered tire air pressure (hereinafter referred to as an "air-pressure-lowered wheel"), respectively. In this example, a wheel whose tire air pressure has become lower than the lower limit of its normal range is called an "air-pressure-lowered wheel."

When the CPU 51 makes a "Yes" determination in Step 210, the CPU 51 proceeds to Step 215, and obtains a friction coefficient μ of a road surface on which the vehicle is currently traveling, on the basis of information obtained from the road-to-vehicle communication unit 43. Subsequently, the CPU 51 proceeds to Step 220, and determines whether or not the road surface on which the vehicle is currently traveling is a road surface having a predetermined low friction coefficient, including an icy road surface (the above-described low-μ road surface; a road surface whose μ is less than a predetermined value). When the CPU 51 makes a "Yes" determination, the CPU 51 proceeds directly to Step 295, and ends the current execution of the present routine.

Figure 3:
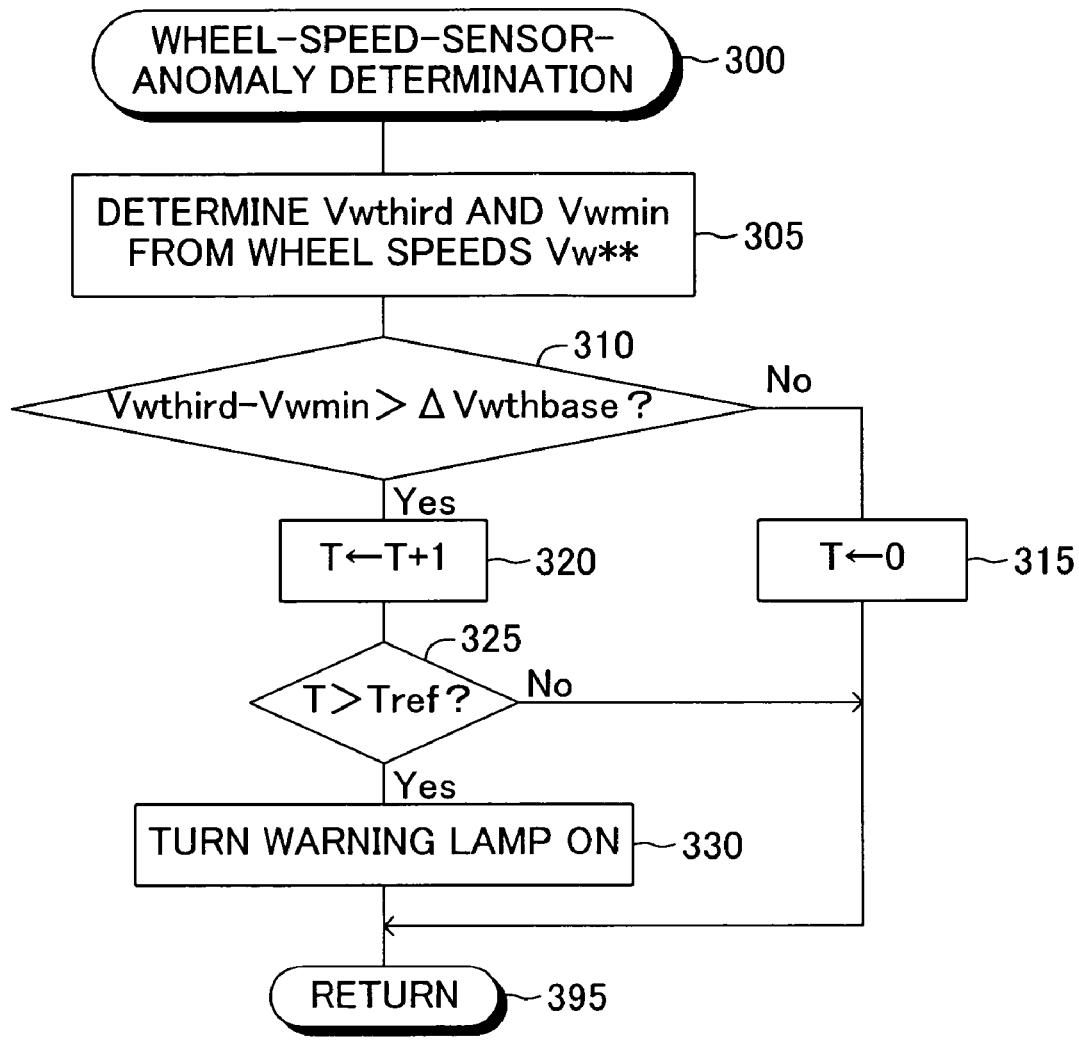
FIG. 3 is a flowchart showing a routine which the CPU shown in FIG. 1 executes in order to perform wheel-speed-sensor-anomaly determination.

Meanwhile, when the CPU 51 makes a "No" determination in Step 210 or 220, the CPU 51 proceeds to Step 225, and performs wheel-speed-sensor-anomaly determination which is shown in FIG. 3 and which will be described later. Subsequently, the CPU 51 proceeds to Step 295 so as to end the current execution of the present routine.

As described above, performance of the wheel-speed-sensor-anomaly determination of an air-pressure-lowered wheel is prohibited only when the air-pressure-lowered wheel exists and the road surface on which the vehicle is currently traveling is a low-μ road surface. In other words, even when an air-pressure-lowered wheel exists, prohibition of the wheel-speed-sensor-anomaly determination is canceled if the road surface on which the vehicle is currently traveling is not a low-μ road surface.

Next, the wheel-speed-sensor-anomaly determination shown in FIG. 3 will be described. The CPU 51 starts the processing of the routine of FIG. 3 from Step 300 via Step 225. That is, the CPU 51 proceeds from Step 300 to Step 305, and calculates the wheel speeds Vw on the basis of the pulse intervals of the respective signals obtained from the wheel speed sensors 41**\*\*. Further, the CPU 51 determines the minimum wheel speed Vwmin among the wheel speeds Vw, and the smallest value among the remaining three wheel speeds Vw (hereinafter referred to as the "third wheel speed Vwthird").

Subsequently, the CPU 51 proceeds to Step 310, and determines whether or not the difference between the third wheel speed Vwthird and the minimum wheel speed Vwmin is greater than a threshold value ΔVwthbase (constant value). When the CPU 51 makes a "No" determination in Step 310, the CPU 51 proceeds to Step 315 so as to initialize the value of a counter T to zero, and then proceeds to Step 395 so as to end the current execution of the present routine.

Meanwhile, when the CPU 51 makes a "Yes" determination in Step 310, the CPU 51 proceeds to Step 320 so as to increment the value of the counter T by one. That is, the counter T represents a continuation time over which the condition of Step 310 is satisfied. Next, the CPU 51 proceeds to Step 325, and determines whether or not the value of the counter T is greater than a determination reference value Tref. When the CPU 51 makes a "No" determination in Step 325, the CPU 51 proceeds directly to Step 395.

When the CPU 51 makes a "Yes" determination in Step 325, the CPU 51 proceeds directly to Step 330 so as to send a turn-on signal to the warning lamp 44, and then proceeds to Step 395 so as to end the current execution of the present routine.

As described above, when the continuation time over which the condition of Step 310 is satisfied exceeds a time corresponding to the determination reference value Tref, the wheel speed sensor 41\*\* of the wheel corresponding to the minimum wheel speed Vwmin is determined to be anomalous, and the warning lamp 44** is turned on.

As described above, in the vehicle control apparatus 10 including the wheel-speed-sensor-anomaly detection apparatus according to the first embodiment of the present invention, when a state in which the difference between the third wheel speed Vwthird and the minimum wheel speed Vwmin is greater than the threshold value ΔVwthbase (constant value) continues over a predetermined time (time corresponding to the determination reference value Tref), in principle, the wheel speed sensor 41\*\* of the wheel** corresponding to the minimum wheel speed Vwmin is determined to be anomalous.

Meanwhile, such wheel-speed-sensor-anomaly detection is prohibited only when an air-pressure-lowered wheel is present and a road surface on which the vehicle is currently traveling is a low-μ road surface. Thus, it becomes possible to reliably prevent erroneous detection of anomaly of the wheel speed sensor of an air-pressure-lowered wheel, which erroneous detection would otherwise occur due to the locking tendency of the air-pressure-lowered wheel occurring because of decreased tire air pressure. In addition, since the prohibition of the wheel-speed-sensor-anomaly detection is cancelled on a road surface which has a relatively high friction coefficient and on which erroneous detection of anomaly of a wheel speed sensor because of decreased tire air pressure hardly occurs, a decrease in the number of occasions in which anomaly of a wheel speed sensor is detected can be suppressed.

The present invention is not limited to the above-described first embodiment, and various modifications may be employed within the scope of the present invention. For example, in the above-described first embodiment, the wheel-speed-sensor-anomaly detection is prohibited only when an air-pressure-lowered wheel is present and a road surface on which the vehicle is currently traveling is a low-μ road surface. However, the wheel-speed-sensor-anomaly detection apparatus of the present embodiment may be configured such that the wheel-speed-sensor-anomaly detection is additionally prohibited when an air-pressure-lowered wheel is present and a road surface on which the vehicle is currently traveling is not a low-μ road surface and the wheel corresponding to the minimum wheel speed Vwmin is the air-pressure-lowered wheel.

Second Embodiment

Next, a vehicle control apparatus including a wheel-speed-sensor-anomaly detection apparatus according to a second embodiment of the present invention will be described. The second embodiment differs from the first embodiment in which the wheel-speed-sensor-anomaly detection is prohibited only when an air-pressure-lowered wheel is present and a road surface on which the vehicle is currently traveling is a low-μ road surface, in that the threshold value ΔVwth which is compared with the "difference between the third wheel speed Vwthird and the minimum wheel speed Vwmin" is changed in accordance with the degree of the decrease in tire air pressure. Hereinafter, such a difference will mainly be described through actual operation of the second embodiment.

Figure 4:
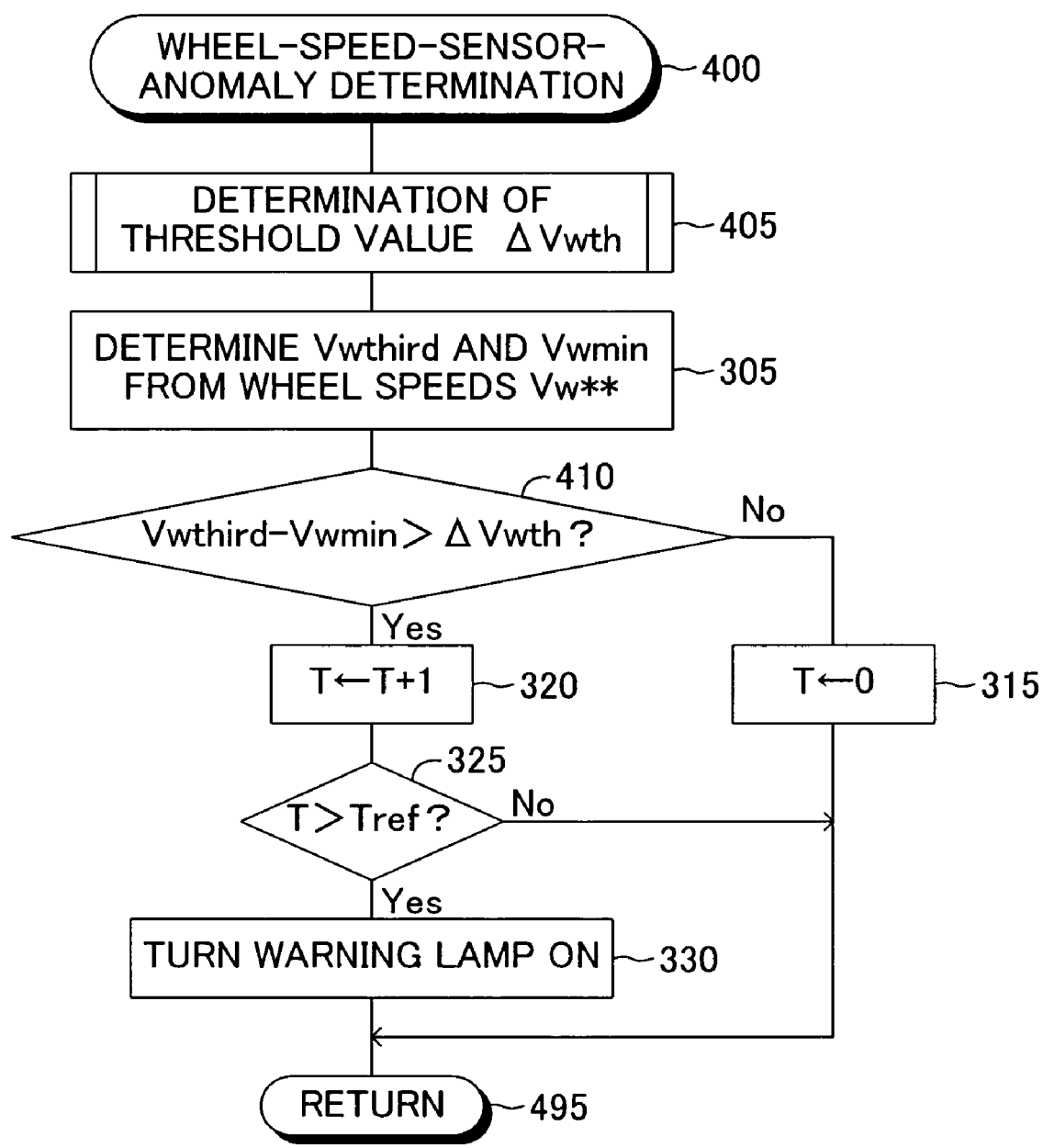
FIG. 4 is a flowchart showing a routine which a CPU of a wheel-speed-sensor-anomaly detection apparatus according to a second embodiment of the present invention executes in order to perform wheel-speed-sensor-anomaly determination.
Figure 5:
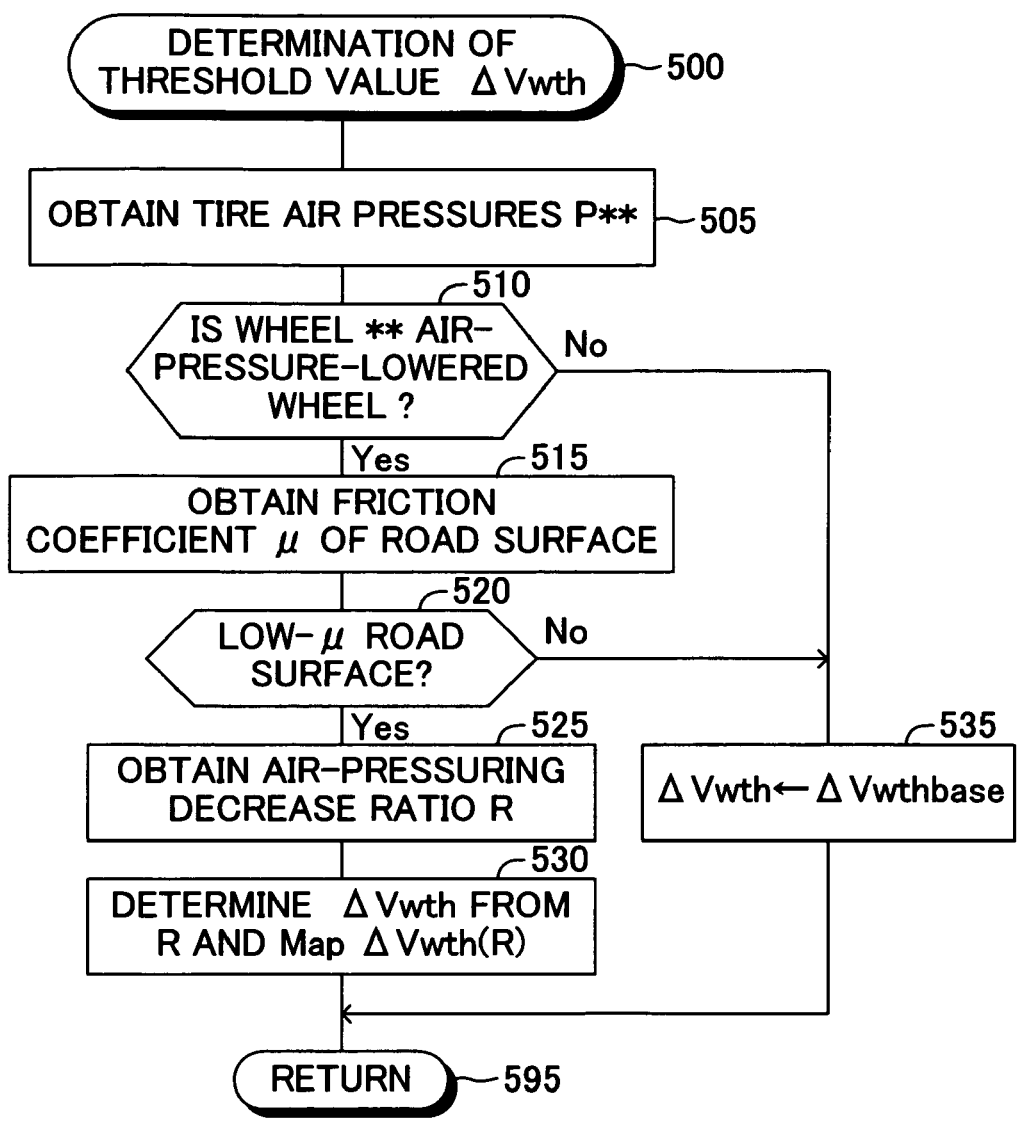
FIG. 5 is a flowchart showing a routine which the CPU of the wheel-speed-sensor-anomaly detection apparatus according to the second embodiment executes in order to determine a threshold value.

Instead of the routines shown in FIGS. 2 and 3 executed by the CPU 51 of the first embodiment, the CPU 51 of the apparatus of the present embodiment repeatedly performs, at predetermined intervals, a routine corresponding to the routine of FIG. 3 and shown in FIG. 4 by means of a flowchart, and a routine shown in FIG. 5 by means of a flowchart. First, the routine of FIG. 4 will be described. Steps of the routine of FIG. 4 which perform the same processing as those of the routine of FIG. 3 are denoted by corresponding step numbers, and their descriptions are not repeated.

The routine of FIG. 4 differs from the routine of FIG. 3 only in the point that Step 405 is added so as to execute the routine of FIG. 5, and a value which is compared with the "difference between the third wheel speed Vwthird and the minimum wheel speed Vwmin" in Step 410 corresponding to Step 310 of FIG. 3 is not the threshold value Vwthbase (constant value) used in Step 310 but a threshold value ΔVwth, which is determined in the routine of FIG. 5. Therefore, a detailed description of the routine of FIG. 4 is omitted.

Next, the routine of FIG. 5 will be described. The CPU 51 starts the processing of the routine of FIG. 5 for determining the threshold value ΔVwth, from Step 500 via Step 405 of FIG. 4. That is, the CPU 51 proceeds from Step 500 to Step 505, and, as in the above-described Step 205, obtains tire air pressures P of the wheels from the gas pressure sensors 42. Subsequently, the CPU 51 proceeds to Step 510, and, as in the above-described Step 210, determines whether or not wheel  is an air-pressure-lowered wheel, respectively.

When the CPU 51 makes a "Yes" determination in Step 510, the CPU 51 proceeds to Step 515, and, as in the above-described Step 215, obtains a friction coefficient μ of a road surface on which the vehicle is currently traveling, on the basis of information obtained from the road-to-vehicle communication unit 43. Subsequently, the CPU 51 proceeds to Step 520, and, as in the above-described Step 220, determines whether or not the road surface on which the vehicle is currently traveling is the above-described low-μ road surface.

When the CPU 51 makes a "Yes" determination in Step 520, the CPU 51 proceeds to Step 525, and obtains an air-pressuring decrease ratio R(%) of the air-pressure-lowered wheel. The air-pressuring decrease ratio R (%) is defined by the following Equation (1):

$$R=(P0-P1)/P0 \quad (1)$$

where P0 is the lower limit of the normal range of the tire air pressure, and P1 is the tire air pressure of the air-pressure-lowered wheel.

Figure 6:
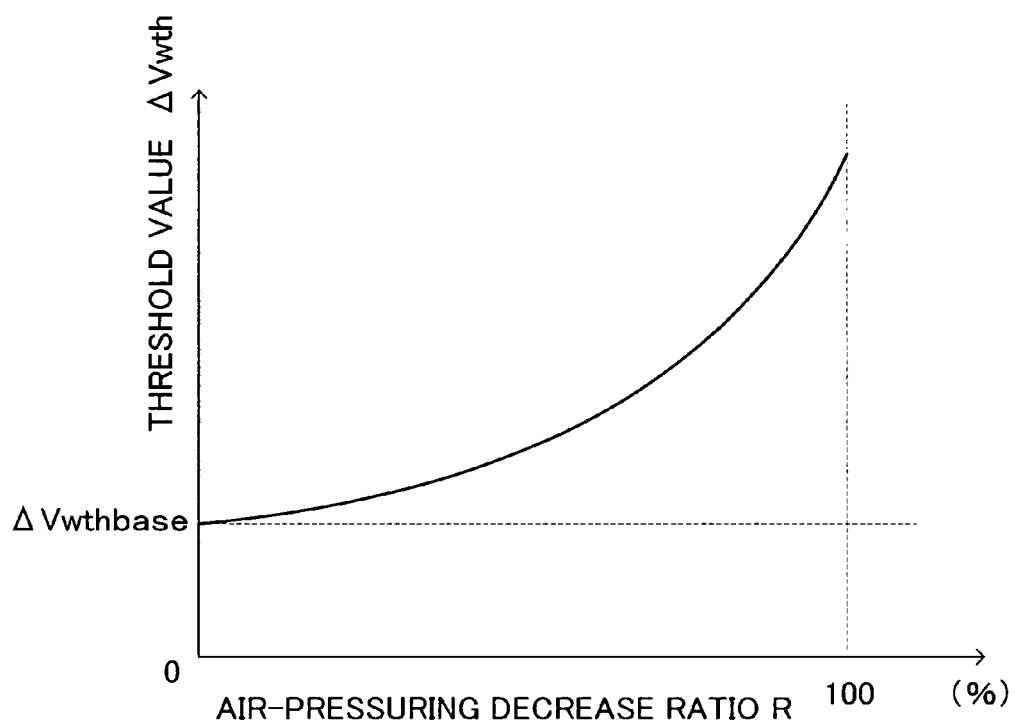
FIG. 6 is a graph showing a table which defines the relation between air-pressure decrease ratio and threshold value referred to by the CPU of the wheel-speed-sensor-anomaly detection apparatus according to the second embodiment.

Subsequently, the CPU 51 proceeds to Step 530, and obtains the threshold value ΔVwth on the basis of the air-pressuring decrease ratio R obtained in Step 525 and a table MapΔVwth(R) which defines the relation between the air-pressuring decrease ratio R and the threshold value ΔVwth shown by a graph in FIG. 6. The CPU 51 then proceeds to Step 595 so as to end the current execution of the present routine. With this processing, the threshold value ΔVwth is set to a value which is greater than the above-mentioned value ΔVwthbase and increases with the air-pressuring decrease ratio R.

Meanwhile, when the CPU 51 makes a "No" determination in Step 510 or Step 520, the CPU 51 proceeds to Step 535 so as to set the threshold value ΔVwth to a value equal to the above-mentioned value ΔVwthbase, and then proceeds to Step 595 so as to end the current execution of the present routine.

As described above, in an ordinary state, the threshold value ΔVwth is fixed to the value ΔVwthbase used in the first embodiment. Meanwhile, when an air-pressure-lowered wheel is present and a road surface on which the vehicle is currently traveling is a low-μ road surface, the threshold value ΔVwth is set to a value which is greater than the above-mentioned value ΔVwthbase and increases with the air-pressuring decrease ratio R of the air-pressure-lowered wheel. In other words, the greater the air-pressure decrease ratio R, the greater the difficultly in satisfying the condition of Step 410 of FIG. 4, and the less likely the detection of an anomaly of a wheel speed sensor. Notably, when the air-pressuring decrease ratio R is equal to or greater than a predetermined value, the threshold value ΔVwth can be set to a sufficient large value (e.g., infinity) such that the condition of Step 410 of FIG. 4 is not satisfied. Thus, when the air-pressuring decrease ratio R is equal to or greater than the predetermined value, the wheel-speed-sensor-anomaly detection can be virtually prohibited.

As described above, in the vehicle control apparatus including the wheel-speed-sensor-anomaly detection apparatus according to the second embodiment of the present invention, when an air-pressure-lowered wheel is present and a road surface on which the vehicle is currently traveling is a low-μ road surface, the greater the air-pressuring decrease ratio R, the higher the value to which the threshold value ΔVwth is set (the greater the degree to which the wheel-speed-sensor-anomaly detection is restricted).

Accordingly, when tire air pressure decreases to a small degree (the air-pressuring decrease ratio R is small) and erroneous detection of anomaly of a wheel speed sensor because of decreased tire air pressure hardly occurs, imposition of an excessive restriction on the wheel-speed-sensor-anomaly detection is prevented. In addition, when tire air pressure decreases to a large degree (the air-pressuring decrease ratio R is large) and erroneous detection of anomaly of a wheel speed sensor because of decreased tire air pressure is likely to occur, erroneous detection of anomaly of the wheel speed sensor of the air-pressure-lowered wheel can be prevented without fail.

The present invention is not limited to the above-described embodiments, and various modifications may be employed within the scope of the present invention. For example, in the above-described embodiments, a restriction is imposed on the wheel-speed-sensor-anomaly detection only when an air-pressure-lowered wheel is present and a road surface on which the vehicle is currently traveling is a low-μ road surface. However, the wheel-speed-sensor-anomaly detection apparatus of the present embodiment may be configured such that when an air-pressure-lowered wheel is present, a restriction is imposed on the wheel-speed-sensor-anomaly detection irrespective of whether the road surface on which the vehicle is currently traveling is a low-μ road surface. In other words, Steps 215 and 220 of FIG. 2 or Steps 515 and 520 of FIG. 5 may be omitted.

Further, in the above-described embodiments, a magnetic-pickup-type (coil-type) sensor is employed as a wheel speed sensor. However, a semiconductor magnetic sensor such as a Hall element or a magnetoresistance element (MR element), optical sensor (optical element), or any other type of sensor may be employed, insofar as a selected sensor tends to detect wheel speed as a smaller value as compared with the normal value when the sensor becomes anomalous.

In addition, in the above-described embodiments, the warning lamp 44, which is turned on upon detection of an anomaly of a wheel speed sensor, is provided. However, a warning lamp which is turned on upon detection of an air-pressure-lowered wheel may be additionally provided.

What is claimed is:

1. A wheel-speed-sensor-anomaly detection apparatus for a vehicle equipped with wheel speed sensors for detecting rotational speeds of respective wheels, comprising:
    anomaly detection means for detecting anomaly of the wheel speed sensors on the basis of at least rotational speeds of the wheels detected by the wheel speed sensors, wherein a wheel speed sensor detects a wheel rotational speed as a smaller value compared with a normal value when an anomaly of the wheel speed sensors occurs;
    gas-pressure-decrease detection means for detecting a decrease in tire gas pressure of each wheel; and
    restriction means for imposing a restriction on the wheel-speed-sensor-anomaly detection operation of the anomaly detection means based on detection of a decrease in the tire gas pressure.

2. A wheel-speed-sensor-anomaly detection apparatus according to claim 1, further comprising:
    road-surface determination means for determining whether or not a road surface on which the vehicle is traveling is a road surface having a predetermined low friction coefficient, including an icy road surface; and
    restriction releasing means for releasing the restriction imposed on the wheel-speed-sensor-anomaly detection operation by means of the restriction means when the road surface on which the vehicle is traveling is determined not to be a road surface having the predetermined low friction coefficient.

3. A wheel-speed-sensor-anomaly detection apparatus according to claim 1, wherein the restriction means is configured such that when a decrease in the tire gas pressure is detected, the restriction means prohibits the wheel-speed-sensor-anomaly detection operation of the anomaly detection means.

4. A wheel-speed-sensor-anomaly detection apparatus according to claim 1, wherein the restriction means is configured such that the greater the decrease in the tire gas pressure, the greater the degree to which the restriction means imposes the restriction on the wheel-speed-sensor-anomaly detection operation of the anomaly detection means.

5. A wheel-speed-sensor-anomaly detection apparatus according to claim 1, wherein the restriction means is configured to impose the restriction on the wheel-speed-sensor-anomaly detection operation of the anomaly detection means with respect to a wheel in which the decrease in the tire gas pressure is detected.

6. A computer-readable medium encoded with a wheel-speed-sensor-anomaly detection program which, when executed by a processor, controls a computer to perform a method for a vehicle equipped with wheel speed sensors for detecting rotational speeds of respective wheels, comprising:
    an anomaly detection step of detecting anomaly of the wheel speed sensors on the basis of at least rotational speeds of the wheels detected by the wheel speed sensors, wherein a wheel speed sensor detects a wheel rotational speed as a smaller value compared with a normal value when an anomaly of the wheel speed sensors occurs;
    a gas-pressure-decrease detection step of detecting a decrease in tire gas pressure of each wheel; and
    a restriction step of imposing a restriction on the wheel-speed-sensor-anomaly detection operation of the anomaly detection step based on detection of a decrease in the tire gas pressure.

7. A wheel speed detection apparatus for a vehicle equipped with assemblies of a wheel and a tire as well as respective wheel speed sensors, comprising:
    first detection means for detecting anomaly of the wheel speed sensors on the basis of wheel speed detected by the wheel speed sensors, wherein a wheel speed sensor detects a wheel rotational speed as a smaller value compared with a normal value when an anomaly of the wheel speed sensors occurs;
    second detection means for detecting decrease of air pressure in the tires; and restriction means for restricting anomaly detection of a specific wheel by the first detection means based on detection of the decrease of the air pressure of the tire of the specific wheel by the second detection means.

* * * * *